US008625079B2

(12) United States Patent
Rousseau

(10) Patent No.: US 8,625,079 B2
(45) Date of Patent: Jan. 7, 2014

(54) MULTICOLORED RANGE-FINDER

(75) Inventor: Pascal Rousseau, Viroflay (FR)

(73) Assignee: Thales, Neuilly sur Seine (FR)

( * ) Notice: Subject to any disclaimer, the term of this patent is extended or adjusted under 35 U.S.C. 154(b) by 847 days.

(21) Appl. No.: 12/529,527

(22) PCT Filed: Feb. 29, 2008

(86) PCT No.: PCT/EP2008/052529
§ 371 (c)(1),
(2), (4) Date: Sep. 25, 2009

(87) PCT Pub. No.: WO2008/107409
PCT Pub. Date: Sep. 12, 2008

(65) Prior Publication Data
US 2011/0116072 A1    May 19, 2011

(30) Foreign Application Priority Data
Mar. 2, 2007  (FR) ...................................... 07 01549

(51) Int. Cl.
*G01C 3/08*    (2006.01)
(52) U.S. Cl.
USPC .......................................... 356/5.01; 356/5.1
(58) Field of Classification Search
USPC ............. 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 4,163,954 | A | * | 8/1979 | Hayes ........................... 359/618 |
| 4,537,502 | A | | 8/1985 | Miller et al. |
| 5,164,733 | A | | 11/1992 | Nettleton et al. |
| 5,276,453 | A | | 1/1994 | Heymsfield |
| 5,307,138 | A | | 4/1994 | Weindling |
| 5,621,514 | A | | 4/1997 | Paranto et al. |
| 5,835,199 | A | * | 11/1998 | Phillips et al. ............... 356/5.03 |
| 6,639,546 | B1 | * | 10/2003 | Ott et al. ....................... 342/129 |

FOREIGN PATENT DOCUMENTS

| EP | 0 720 028 A | 7/1996 |
| FR | 2 543 690 A | 10/1984 |
| WO | WO 2006/077588 A | 7/2006 |

* cited by examiner

*Primary Examiner* — Luke Ratcliffe
(74) *Attorney, Agent, or Firm* — LaRiviere, Grubman & Payne, LLP

(57) ABSTRACT

The present invention relates to a range-finder comprising a laser pulse emission device and a device for detecting the pulses reflected by a distant object.

The emission device is capable of emitting pulses of N distinct wavelengths, N being an integer greater than 1, with, for each wavelength, a pulse repetition frequency less than a predetermined threshold frequency.

Thus, no given wavelength emission will be faced with the problem of distance ambiguity.

15 Claims, 1 Drawing Sheet

MULTICOLORED RANGE-FINDER

PRIORITY CLAIM

This application claims priority to PCT Application Number PCT/EP2008/052529, entitled Multicolored Range-Finder, filed on Feb. 29, 2008 and French Application Number 07 01549, entitled Multicolored Range-Finder, filed Mar. 2, 2007.

TECHNICAL FIELD

The field of the invention is that of pulsed laser range-finders.

The operating principle of a range-finder is reviewed below.

To measure the distance between the range-finder and a target, a pulse is emitted toward the target. The light is backscattered by the target toward the range-finder and the return pulse, also designated echo, is detected. The distance is measured from the duration between the departure of the pulse and its return.

The light is absorbed by the atmosphere, along the outbound path. It is then absorbed and scattered by the target then absorbed by the atmosphere on the return path; it is diluted along the return path by a factor proportional to the square of the distance. When the distance increases, the quantity of light detected rapidly decreases.

BACKGROUND OF THE INVENTION

To increase the range-finding distance despite these atmospheric losses, the following routes are available:
  increase the energy per pulse, but this increase is limited by ocular safety constraints and by the volume of the emitter which increases with the energy per pulse,
  increase the size of the reception pupil but this increases the dimensions of the system,
  increase the sensitivity of the receiver with multi-pulse systems that use micro-lasers or fiber optic lasers. This makes it possible to use post-integration. There is an increase in the average power (energy per pulse×rate) without increasing the energy per pulse.

Currently, three main laser range-finder categories can be distinguished:
  range-finders with modulated continuous emission
  multi-pulse range-finders
  single-pulse range-finders.

The range-finders that have modulated continuous emission are used either with cooperative targets or when the measurement time is not critical. A cooperative target is, for example, equipped with a retroreflector, and thus returns more light.

For long distances (>10 km), the range-finders normally use a single high-energy pulse limited by ocular safety in conditions of use, that is to say, less than 100 mJ and for a wavelength of between 1.5 and 1.8 µm. This energy, depending on the applications, ranges from a few millijoules to a few tens of millijoules per pulse.

The multi-pulse range-finders are used for short distances (<10 km) with post-integration. To reduce the cost, the emission from a laser diode is used.

The post-integration presents certain drawbacks.
Thus, it should be recalled that:
  if, for an emitted pulse, SNR is the detected echo,
  then, for n pulses emitted we have $(nS)/(n^{1/2} N)$, or $(n^{1/2} S)/N$, hence an improvement by a factor $n^{1/2}$.

However, in the case of post integration, the pulse repetition frequency limits the distance that can be reached because of the distance ambiguity. This ambiguity occurs when a detected pulse originates either from the last pulse emitted, returned by a near target, or from a pulse emitted previously and returned by a distant target, without there being any way of determining which target is measured between these 2 alternatives.

One solution applied by radars to eliminate this ambiguity consists in using a variable pulse repetition frequency (or rate): the variable time interval between two pulses makes it possible to carry out the accumulation (post-integration) despite this ambiguity to the detriment of an increase in the level of noise in which the ambiguous echoes are buried. However, in the case of optical pulses, reception which is sensitive to the emission wavelength can be disturbed by the backscattering of the atmosphere and by the echoes of the short-distance emissions.

Another solution consists in waiting long enough for a pulse to return before emitting the next pulse. The distance to be taken into account can be greater than the guaranteed maximum range. A target forming a retroreflector can provide an echo that can be detected well beyond the expected maximum range. This means not exceeding a pulse repetition threshold frequency, called threshold frequency, to avoid having ambiguities. For example, for a range of 75 km, the round-trip duration of a signal is approximately 500 µs; in this case, the threshold frequency is therefore 2 kHz. If an integration time of 1 second is acceptable, it is then possible to accumulate 2000 measurements, or an increase in SNR by a factor 44 (square root of 2000), which is significant. For this reasoning to be valid, the target must be sufficiently stationary throughout the measurement duration.

SUMMARY OF THE INVENTION

The aim of the invention is to increase the range-finding distance while avoiding the obstacles of distance ambiguity, inadequate ocular safety and, if possible, significant bulk.

The solution is based on the emission of pulses of N distinct wavelengths with, for each wavelength, a pulse repetition frequency less than the threshold frequency. Thus, no emission at a given wavelength is faced with the problem of distance ambiguity.

Each of these emissions has a corresponding reception. There are therefore just as many receptions at distinct wavelengths that detect the echoes (or reflected pulses) for each wavelength. The measurements are then aggregated for the N receptions.

Thus, for a threshold frequency of 2 kHz, an integration time of 1 second and N=10, it is possible to accumulate 2000×10=20 000 measurements, and therefore obtain an improvement in SNR by a factor of 141 (square root of 20 000) without being faced with ambiguity regarding the measurements.

A wavelength should be understood to mean a narrow spectral band: typically, approximately 40 wavelengths of between 1.5 and 1.6 µm are considered. The technology implemented in this invention allows for a far greater number of spectral bands.

More specifically, the subject of the invention is a range-finder comprising a laser pulse emission device and a device for detecting the pulses reflected by a distant object. It is mainly characterized in that the emission device is capable of emitting pulses of N distinct wavelengths, N being an integer greater than 1, with, for each wavelength, a pulse repetition frequency less than a predetermined threshold frequency.

According to a characteristic of the invention, it comprises a detection device capable of detecting the reflected pulses for each of the N wavelengths and a device for accumulating all the detected pulses.

According to another characteristic of the invention, the emission device comprises K emitters, each being capable of emitting pulses at $M_i$ distinct wavelengths, i varying from 1 to K, with $M_1+M_2+ \ldots +M_k=N$, K being an integer such that $1<=K<=N$.

The emission device comprises, if appropriate, an optical amplification device for amplifying each pulse emitted which can be a wideband amplifier with a bandwidth that includes the N wavelengths, and/or K narrowband amplifiers with bandwidths corresponding respectively to the $M_i$ wavelengths.

Advantageously, when K>1, the emission device comprises a multiplexing device for multiplexing the pulses obtained from the K emitters.

Preferably, the emission device comprises at least one optical emission coupler.

According to one characteristic of the invention, the emitters are laser diodes.

According to another characteristic of the invention, the detection device comprises K' detectors, K' being an integer such that $1<=K'<=N$, each detector $D_j$ being capable of detecting pulses according to $P_j$ distinct wavelengths, j varying from 1 to K' with $P_1+P_2+ \ldots +P_{k'}=N$.

The detection device comprises, if appropriate, an optical amplification device for amplifying each pulse received which can be a wideband amplifier with a bandwidth that includes the N wavelengths, and/or K' narrowband amplifiers with bandwidths corresponding respectively to the $P_j$ wavelengths.

The detection device advantageously comprises an optical filtering device for filtering the pulses received according to N wavelengths.

Preferably, the detection device comprises at least one optical detection coupler.

BRIEF DESCRIPTION OF THE DRAWINGS

Other features and benefits of the invention will become apparent from reading the detailed description that follows, given by way of nonlimiting example, and by referring to the appended drawings in which.

DETAILED DESCRIPTION

Figure 1A:
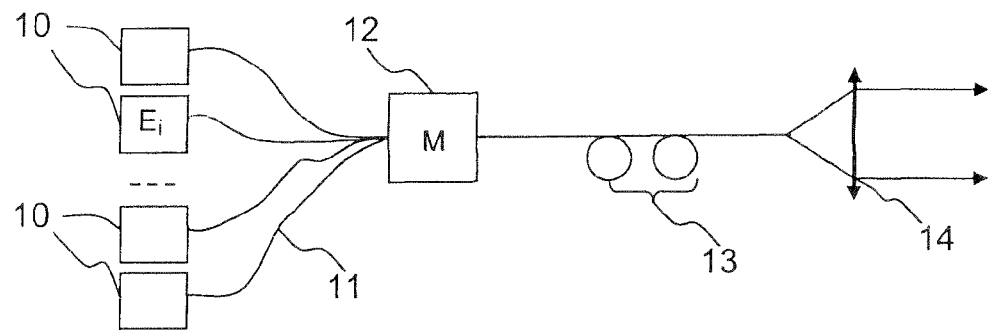
FIGS. 1a and 1b diagrammatically represent the emission and reception parts of an exemplary range-finder according to the invention.

Examples of range-finders according to the invention will now be described in more detail. The emission part of these range-finders is first considered in relation to FIG. 1a. Devices for orienting the line of sight, which are not represented, can be inserted on the optical paths.

For the emission part of the range-finder, the basic functions are emission, multiplexing (if any) and optical coupling.

The emission device comprises N emitters 10 arranged in parallel with, for each emitter:
a distinct wavelength, and
pulse repetition frequency less than the threshold frequency. Thus, no emitter is faced with the problem of distance ambiguity.

The emission device more generally comprises K emitters, each emitter $E_i$ 10 being capable of emitting pulses according to $M_i$ distinct wavelengths, i varying from 1 to K with $M_1+M_2+ \ldots +M_k=N$, and each operating at $M_i$ pulse repetition frequencies less than the threshold frequency.

The optical beam emitted by an emitter $E_i$ is therefore multi-wavelength, that is to say, comprises $M_i$ optical channels.

From one wavelength to another, the pulse repetition frequencies can be different or the same. The emission instants of the pulses of different wavelengths are preferably different. In the case a single emitter $E_i$ for several wavelengths, the emission instants of the pulses are different because of the energy needed for each pulse which otherwise would be shared; such is also the case for a wavelength-tunable emitter which operates sequentially in time.

The range-finder comprises a coupling optic 14 which formats the beam for emission through the atmosphere to the target: the emitted laser beam is collimated toward the target by the emission coupler to produce a beam with low divergence. There is one optical coupler for each emitter or one optical coupler common to the K emitters as represented in the FIGURE.

In the case where the emission of the pulses is obtained by K distinct emitters and where the range-finder has a single coupling optic in emission, an optical multiplexing device 12 is necessary. In this case, the K optical beams conveying pulses of different wavelengths are grouped together into a single optical beam.

Preferably, the range-finder also comprises a device for amplifying each pulse emitted which, while imparting the maximum energy to the pulse, maintains its spectral and temporal properties. A wide band amplification device 13 immaterially amplifies the pulses of each wavelength, in other words, it covers the range of the N wavelengths of the emitters; narrowband amplification devices specifically amplify the pulses of each wavelength, that is to say, one amplification device is dedicated to each wavelength. In the case where K emitters $E_i$ are used, the bandwidth of each narrowband amplifier covers the corresponding $M_i$ wavelengths. One wide band amplification device and/or narrowband amplification devices can be selected.

Several possible configurations for the emission part of the range-finder can be envisaged.

Configuration A: the emission device comprises K emitters and K optical couplers.

Configuration B: the emission device comprises K emitters and an optical multiplexer grouping together the K optical beams into 1 optical beam directed toward 1 optical coupler.

Configuration C: the emission device comprises K emitters, K optical beams respectively directed toward K optical couplers; the emissions at the N distinct wavelengths are amplified by K narrowband amplifiers situated downstream or upstream of the optical couplers. This corresponds to configuration A, with narrowband amplifiers added to it.

Configuration D: the emission device comprises K emitters, K optical beams and an optical multiplexer grouping together the K beams into 1 optical beam directed toward 1 optical coupler; the emissions at the N distinct wavelengths are respectively amplified by K narrowband amplifiers situated between the emitters and the optical multiplexer.

Configuration E: the emission device comprises K emitters, K optical beams and an optical multiplexer grouping together the K beams into 1 optical beam directed toward 1 optical coupler; it also comprises a wideband amplifier situated between the multiplexer and the coupler. This corresponds to configuration B complemented with wide band amplification.

Configuration F: the emission device comprises K emitters, K optical beams and an optical multiplexer grouping together the K beams into 1 optical beam directed toward 1 optical coupler; the emissions at the N distinct wavelengths are respectively amplified by K narrowband amplifiers situated between the emitters and the optical multiplexer and by a wideband amplifier situated between the multiplexer and the coupler or downstream of the coupler. This corresponds to configuration D, complemented with wide band amplification.

The table below summarizes these various configurations with N=K: N distinct emitters are considered in the interests of simplicity.

| | | EMISSION | | | |
|---|---|---|---|---|---|
| | Emitters | Narrowband amplifier | Optical multiplexer | Wideband amplifier | Optical coupler |
| A | N | | | | N |
| B | N | | N → 1 | | 1 |
| C | N | N | | | N |
| D | N | N | N → 1 | | 1 |
| E | N | | N → 1 | 1 | 1 |
| F | N | N | N → 1 | 1 | 1 |

Figure 1B:
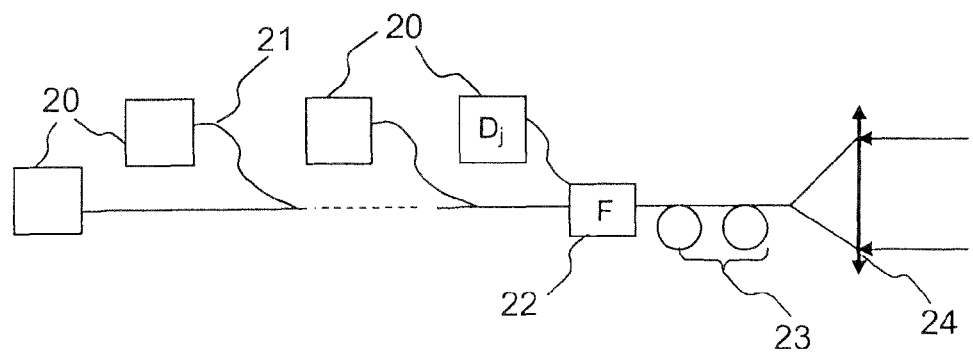

The reception part of the range-finders will now be considered in relation to FIG. 1b. In the same way as for emission, the basic functions of the range-finder, for the reception part, are: optical coupling with the atmosphere, possibly optical demultiplexing, detection, accumulation over all the wavelengths of the detected signals.

The range-finder comprises a reception optic for coupling with the atmosphere. The optical coupling is needed to collect the pulses backscattered (or reflected) by the illuminated target and direct them toward the detector. There is one optical coupler 24 for each receiver or one optical coupler common to several receivers.

The reception device preferably comprises an amplification device 23 for amplifying each reflected pulse which makes it possible to amplify the very weak signals by adding the minimum noise to them: the aim is to enhance the detection signal-to-noise ratio. As for emission, a wide band amplification device which immaterially amplifies each pulse and/or narrowband amplification devices which specifically amplify each pulse can be selected.

An optical filter 22 for filtering the reflected pulses coming from the object is used to separate the different channels to be detected, that is, to demultiplex them. The separation is spectral.

After this filtering, the pulses of each channel can be amplified by means of a narrowband amplifier.

A detector can be used only in relation to a single channel. Since the distance to the object is not known, the detection must be active as long as echoes are expected. Detection can be obtained by a detector capable of detecting the pulses reflected for several wavelengths and of distinguishing them according to their wavelength. There are, more generally, K' detectors 20, each detector $D_j$ being capable of detecting pulses according to $P_j$ distinct wavelengths, j varying from 1 to K' with $P_1+P_2+ \ldots +P_{k'}=N$.

A conventional accumulation device is used to perform the post-integration of the detected pulses.

The coupling optics 14 and 24 can be common to both emission and reception.

In the case where K' detectors $D_j$ and narrowband amplifiers are used, the bandwidth of each narrowband amplifier covers the corresponding $P_j$ wavelengths.

Several possible configurations for the reception part of the range-finder can be envisaged.

Configuration G: the reception device comprises K' optical couplers and K' detectors.

Configuration H: the reception device comprises 1 optical coupler, a filter separating the K' beams obtained from the optical coupler to direct them respectively to K' detectors.

Configuration I: the reception device comprises K' optical couplers, K' detectors and K' narrowband amplifiers situated between the couplers and the detectors or upstream of the couplers. This corresponds to configuration G with narrowband amplifiers added to it.

Configuration J: the reception device comprises 1 optical coupler, a filter separating the K' beams obtained from the optical coupler to direct them respectively to K' detectors, and K' narrowband amplifiers situated between the couplers and the detectors or upstream of the couplers. This corresponds to configuration H with narrowband amplifiers added to it.

Configuration K: the reception device comprises 1 optical coupler, a filter separating the K' beams obtained from the optical coupler to direct them respectively to K' detectors, and a wideband amplifier situated between the couplers and the detectors. This corresponds to configuration H with a wideband amplifier added to it.

Configuration L: the reception device comprises 1 optical coupler, a filter separating the K' beams obtained from the optical coupler to direct them respectively to K' detectors, and a wideband amplifier situated between the filter and the detectors and K' narrowband amplifiers situated between the coupler and the filter.

The table below summarizes these various possible configurations with K'=N: N distinct detectors are considered in the interests of simplicity.

| | | RECEPTION | | | |
|---|---|---|---|---|---|
| | Optical coupler | Wide band amplifier | Filter | Narrowband amplifier | Detector |
| G | N | | | | N |
| H | 1 | | 1 → N | | N |
| I | N | | | N | N |
| J | 1 | | 1 → N | N | N |
| K | 1 | 1 | 1 → N | | N |
| L | 1 | 1 | 1 → N | N | N |

The reception configurations are related to the emission configurations by the number and the precise values of the channels used.

An exemplary range-finder according to the invention will now be described in detail. It has the following characteristics:
  for the planned mission profiles, the theoretical range is 96 km.
  a pulse repetition threshold frequency therefore equal to 1568 Hz
  N=32 and λ between 1540.65 nm and 1565.65 nm.

The emission device comprises the following elements.

It comprises N emitters 10, each emitting a wavelength, arranged in parallel, each operating at a pulse repetition frequency less than the threshold frequency. Thus, no emitter is faced with the problem of distance ambiguity. Preferably, small emitters are used, such as laser diodes, or even light-emitting diodes. These laser diodes typically have a pulse repetition frequency equal to 1250 Hz, and a pulse width equal to 10 ns.

Each emitter is linked to an optical multiplexer 12 by means of an optical fiber 11. The optical multiplexer groups together the N optical channels into a single optical channel. Cisco ONS 15454 32 channels 100 GHz Optical Multiplexer can be cited as an example of an optical multiplexer that groups together N optical fibers into a single optical fiber.

The multiplexer is linked by an optical fiber to a wideband amplifier 13. The aim of this amplifier is to increase the energy per pulse, typically from a few nJ to a few mJ.

The amplifier is in turn linked to an optical coupler 14. The emitted laser beam is collimated toward the target by the emission coupler to produce a beam of low divergence. This coupler is, for example, a collimating lens.

Each of the emitters has a corresponding detector. There are therefore as many distinct wavelength detectors detecting the backscattered pluses for each wavelength.

The device for receiving pulses backscattered by the target comprises the following elements.

It comprises a reception coupler 24 such as a reception lens of the same type as that of the emission device. At the output of the coupler, the beam is directed toward a wide band optical amplifier 23 by means of an optical fiber. The aim of this amplifier is to increase SNR, that is to say, increase the gain without increasing the noise, typically by a factor of 1000.

The amplifier is linked to a filter 22 capable of separating the optical beam with N wavelengths into N optical beams of distinct wavelengths. This filter is, for example, a Bragg array.

The N optical beams are directed by means, for example, of optical fibers 21, toward N detectors 20, the wavelengths of which correspond to those of the N emitters. These detectors are typically InGaAs photodiodes that can be avalanche photodiodes, capable of transforming an optical signal into an electrical signal. Each electrical signal is then digitized, for example at a sampling frequency of approximately 100 MHz.

Each optical pulse emitted has an associated data stream considered during a duration beginning on emission of the pulse and extending through to the instant corresponding to the distance of interest selected for the system. Post-integration is the operation whereby these data streams are aggregated, and is performed by the accumulation device. The signals detected that correspond to the same distance are aggregated together. At the distance where there is a real target, the signal should be distinguished from the noise if there are enough pulses.

The emission and reception optical pathways are, preferably, separate, given the imbalance between the energies of the emitted pulses and those of the reflected pulses received by the reception device.

If necessary, it is possible to envisage some of the optical pathways being shared in the case of alternating emission and reception operation.

What is claimed is:

1. A range-finder comprising a laser pulse emission device, a device for detecting the pulses reflected by a distant object, and a means to post-integrate the detected pulses and provide a signal to noise ratio proportional to the square root of the number of emitted pulses, wherein the emission device is capable of emitting pulses of N distinct wavelengths, N being an integer greater than 1, with, for each wavelength, a pulse repetition frequency less than a predetermined threshold frequency to avoid distance ambiguity and wherein from one wavelength to another, the pulse repetition frequencies are different.

2. The range-finder as claimed in claim 1, wherein the pulses are emitted at emission instants, and wherein the emission instants of the pulses of different wavelengths are different.

3. The range-finder as claimed in claim 1, wherein the detection device detects the reflected pulses for each of the N wavelengths, and further comprises a device for accumulating the detected pulses.

4. The range-finder as claimed in claim 1, wherein the emission device comprises K emitters, each being capable of emitting pulses at $M_i$ distinct wavelengths, i varying from 1 to K, with $M_1+M_2+ \ldots +M_k=N$, K being an integer such that $1<=K<=N$.

5. The range-finder as claimed in claim 1, wherein the emission device comprises an optical amplification device for amplifying each emitted pulse.

6. The range-finder as claimed in claim 5, wherein the amplification device comprises a wideband amplifier with a bandwidth that includes the N wavelengths, and/or K narrowband amplifiers with bandwidths corresponding respectively to the $M_i$ wavelengths, K being an integer such that $1<=K<=N$.

7. The range-tinder as claimed in claim 1, wherein the emission device comprises at least one optical emission coupler.

8. The range-finder as claimed in claim 1, wherein the emitters are laser diodes.

9. The range-finder as claimed in claim 1, wherein the detection device comprises K' detectors, K being an integer such that $1<=K'-=N$, each detector $D_j$ being capable of detecting pulses according to $P_j$ distinct wavelengths, j varying from 1 to K' with $P_1+P_2+ \ldots +P_k=N$.

10. The range-finder as claimed in claim 1, wherein the detection device comprises an optical amplification device for amplifying each pulse received.

11. The range-finder as claimed in claim 1, wherein the amplification device comprises a wideband amplifier with a bandwidth that includes the N wavelengths, and/or K' narrowband amplifiers with bandwidths corresponding respectively to the $P_j$ wavelengths.

12. The range-finder as claimed in claim 1, wherein the detection device comprises an optical filtering device for filtering the pulses received according to N wavelengths.

13. The range-finder as claimed in claim 1, wherein the detection device comprises at least one optical detection coupler.

14. The range-finder as claimed in claim 4, wherein the emission device comprises an amplification device with K narrowband amplifiers with bandwidths corresponding respectively to the $M_i$ wavelengths, K being an integer such as $1 \leq K$ and wherein the emission device comprises a multiplexing device for multiplexing the pulses obtained from the K emitters.

15. The range-finder as claimed in claim 14, wherein, when K>1, the emission device comprises a multiplexing device for multiplexing the pulses obtained from the K emitters.

* * * * *

UNITED STATES PATENT AND TRADEMARK OFFICE
CERTIFICATE OF CORRECTION

PATENT NO.       : 8,625,079 B2
APPLICATION NO.  : 12/529527
DATED            : January 7, 2014
INVENTOR(S)      : Pascal Rousseau Page 1 of 1

It is certified that error appears in the above-identified patent and that said Letters Patent is hereby corrected as shown below:

In the claims:
Column 8, line 33, Claim 9; delete "K being" and replace with --K' being--; and
Column 8, line 34, Claim 9; delete "1<=K'-=N" and replace with --1<=K'<=N--.

Signed and Sealed this
Third Day of June, 2014

Michelle K. Lee
*Deputy Director of the United States Patent and Trademark Office*